United States Patent [19]

Kadota

[11] Patent Number: 5,177,474

[45] Date of Patent: Jan. 5, 1993

[54] THREE-DIMENSIONAL DISPLAY APPARATUS

[75] Inventor: Hiroshi Kadota, Osaka, Japan

[73] Assignee: Matsushita Electric Industrial Co., Ltd., Osaka, Japan

[21] Appl. No.: 575,769

[22] Filed: Aug. 31, 1990

[30] Foreign Application Priority Data

Sep. 13, 1989 [JP] Japan .................. 1-237799

[51] Int. Cl.⁵ .............................................. G09G 1/06
[52] U.S. Cl. .................................... 340/729; 395/119
[58] Field of Search ............... 340/709, 729; 364/522; 395/119

[56] References Cited

U.S. PATENT DOCUMENTS

| | | | |
|---|---|---|---|
| 4,745,405 | 5/1988 | Himelstein et al. | 340/709 |
| 4,808,979 | 2/1989 | DeHoff et al. | 340/709 |
| 4,812,829 | 3/1989 | Ebina et al. | 340/709 |
| 4,835,528 | 5/1989 | Flinchbaugh | 340/709 |

Primary Examiner—Ulysses Weldon
Attorney, Agent, or Firm—Lowe, Price, LeBlanc & Becker

[57] ABSTRACT

A calculator calculates projection coordinates of principal vertexes of a displayed object with respect to a projection plane from a visual point. An evaluation device evaluates whether surfaces of the object which are determined by the principal vertexes are visible or invisible from the visual point. A result of the evaluating by the evaluation device is indicated. A memory stores information of a position of a predetermined virtual operation plane. A pointing device is movable on an actual operation plane. A calculator connected to the memory and the pointing device calculates a correspondence point on the virtual operation plane which corresponds to a position of the pointing device when the pointing device moves on the actual operation plane. A calculator calculates a half line which starts from the correspondence point and which intersects with the virtual operation plane at a predetermined angle. A setting device sets the predetermined angle. A calculator calculates a point of an intersection between the half line and the displayed object. A calculator calculates projection coordinates of at least part of the half line with respect to the projection plane. The calculated projection coordinates of at least part of the half line are indicated.

2 Claims, 6 Drawing Sheets

FIG. 11

THREE-DIMENSIONAL DISPLAY APPARATUS

BACKGROUND OF THE INVENTION

This invention relates to an apparatus for displaying information in a three-dimensional manner on a two-dimensional screen.

There are various three-dimensional display apparatuses in which three-dimensional graphics information is indicated stereographically on a two-dimensional screen such as a CRT. In these three-dimensional display apparatuses, a three-dimensional cursor is generally required to efficiently edit the indicated graphics information. Specifically, the three-dimensional cursor is used in designating a point within a three-dimensional space and in selecting one of three-dimensional figures partially overlapping each other. The three-dimensional cursor on the screen is controlled via a manually-operated pointing device. The control of the cursor via the pointing device tends to be unsmooth. The three-dimensional coordinate point represented by the cursor tends to be unclear.

SUMMARY OF THE INVENTION

It is an object of this invention to provide an improved three-dimensional display apparatus.

According to a first aspect of this invention, a three-dimensional display apparatus comprises means for calculating projection coordinates of principal vertexes of a displayed object with respect to a projection plane from a viewing point; means for evaluating whether surfaces of the object which are determined by the principal vertexes are visible or invisible from the viewing point; means for indicating a result of the evaluating by said evaluating means; a memory storing information of a position of a predetermined virtual operation plane; a pointing device movable on an actual operation plane; means connected to the memory and the pointing device for calculating a correspondence point on the virtual operation plane which corresponds to a position of the pointing device when the pointing device moves on the actual operation plane; means for calculating the position of a half line which starts from the correspondence point and which intersects the virtual operation plane at a predetermined angle; means for setting said predetermined angle; means for calculating the position of an intersection point between the half line and the displayed object; means for calculating projection coordinates of at least part of the half line with respect to the projection plane; and means for indicating the calculated projection coordinates of at least part of the half line.

According to a second aspect of this invention, a three-dimensional display apparatus comprises means for calculating projection coordinates of principal vertexes of a displayed object with respect to a projection plane from a viewing point; means for evaluating whether surfaces of the object which are determined by the principal vertexes are visible or invisible from the viewing point; means for indicating a result of the evaluation by said evaluating means; a memory storing information of a position of a predetermined virtual operation plane; a pointing device movable on an actual operation plane; means connected to the memory and the pointing device for calculating the location of a correspondence point on the virtual operation plane which corresponds to a position of the pointing device when the pointing device moves on the actual operation plane; means for calculating the position of a half line which starts from a reference point and which passes through the correspondence point, the reference point being displaced from the virtual operation plane; means for setting said reference point; means for calculating the location of an intersection point between the half line and the displayed object; means for calculating projection coordinates of at least part of the half line with respect to the projection plane; and means for indicating the calculated projection coordinates of at least part of the half line.

According to a third aspect of this invention, a three-dimensional display apparatus comprises means for calculating projection coordinates of principal vertexes of a displayed object with respect to a projection plane from a viewing point; means for evaluating whether surfaces of the object which are determined by the principal vertexes are visible or invisible from the viewing point; means for indicating a result of the evaluation by said evaluating means; a memory storing information of a position of a predetermined virtual operation plane; a pointing device movable on an actual operation plane; means connected to the memory and the pointing device for calculating the position of a correspondence point on the virtual operation plane which corresponds to a position of the pointing device when the pointing device moves on the actual operation plane; first line calculating means for calculating the position of a half line which starts from the correspondence point and which intersects the virtual operation plane at a predetermined angle; means for setting said predetermined angle; second line calculating means for calculating the position of a half line which starts from a reference point and which passes through the correspondence point, the reference point being displaced from the virtual operation plane; means for setting said reference point; means for selecting one of the first line calculating means and the second line calculating means; means for calculating the position of an intersection point between the displayed object and the half line calculated by said selected one of the first line calculating means and the second line calculating means; means for calculating projection coordinates of at least part of the half line calculated by said selected one of the first line calculating means and the second line calculating means with respect to the projection plane; and means for indicating the calculated projection coordinates of at least part of the half line.

According to a fourth aspect of this invention, a three-dimensional display apparatus comprises a pointing device for generating a signal designating a point on an actual operation plane; means for setting data representing a predetermined virtual operation plane; means for calculating the position of a correspondence point on the virtual operation plane, the correspondence point corresponding to the point on the actual operation plane which is designated by the signal of the pointing device; means for calculating the position of a line on which the correspondence point extends; means for calculating projection coordinates of the line with respect to a predetermined projection plane; and means for displaying a cursor line in accordance with the calculated projection coordinates of the line.

DESCRIPTION OF THE PRIOR ART

Before describing this invention, a prior art apparatus will be explained for a better understanding of this invention.

Figure 1:
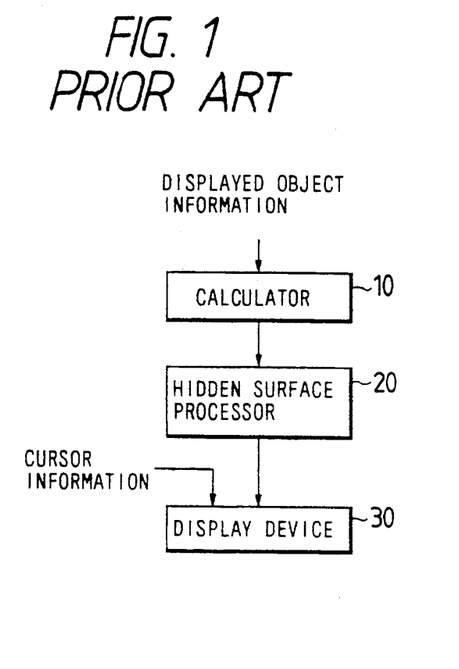
FIG. 1 is a block diagram of a prior art three-dimensional display apparatus.

FIG. 1 is a block diagram of a prior art three-dimensional display apparatus which includes a calculator 10 fed with information of an object to be displayed. In the case where the object is a circular cylinder, the object information represents the radius, the height, the coordinates of the center, and the direction of the axis. The calculator 10 calculates the projection coordinates of projection points on a predetermined projection plane a the projection points correspond to principal vertexes of the object. The calculated projection coordinates are measured from a predetermined visual point. The calculator 10 uses the object information and information of the position of the visual point and the projection plane in the calculation of the projection coordinates.

The calculated projection coordinates are fed from the calculator 10 to a hidden surface processor 20. The hidden surface processor 20 uses the calculated projection coordinates, and evaluates a visible part and an invisible part of surfaces of the object which are determined by the principal vertexes of the object. The hidden surface processor 20 executes this evaluation through a suitable process such as a hidden surface process using a z buffer method. The hidden surface processor 20 outputs information of the visible part of the surfaces of the object to a display device 30. The visible part of the surfaces of the object is stereographically indicated on the screen of the display device 30. In addition, cursor position is indicated on the screen of the display device 30 in accordance with cursor position information fed to the display device 30 from a suitable device (not shown).

Figure 2:
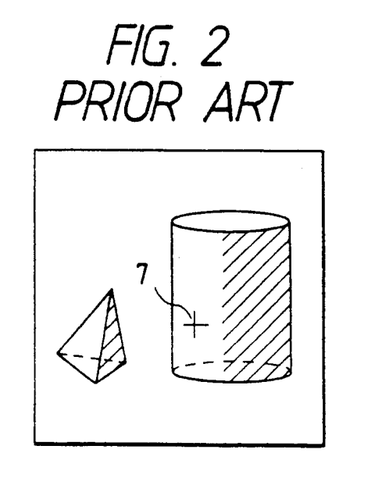
FIG. 2 is a diagram of an example of the state of an indication on the screen in the prior art apparatus of FIG. 1.

FIG. 2 is an example of the indication of the object and the cursor on the screen of the display device 30. The position of cursor 7, FIG. 2, on the display device can be controlled via a pointing device (not shown in FIG. 1). As understood from FIG. 2, the point in the three-dimensional space which is designated by the cursor 7 tends to be unclear.

DESCRIPTION OF THE FIRST PREFERRED EMBODIMENT

Figure 3:
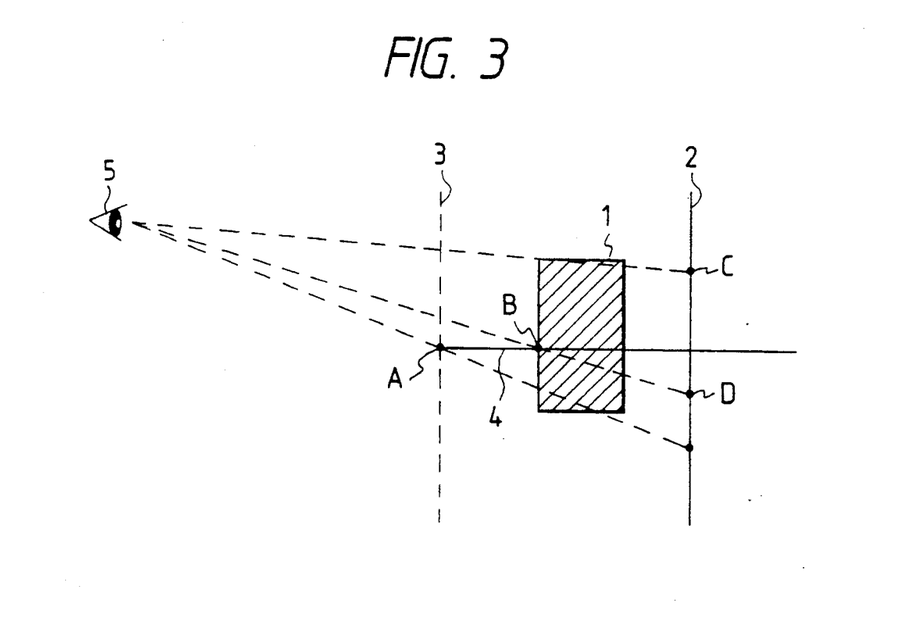
FIG. 3 is a diagram of a displayed object, a projection plane, a virtual operation plane, and a three-dimensional cursor line in a three-dimensional display apparatus according to a first embodiment of this invention.

With reference to FIG. 3, a predetermined viewing point 5, an object 1 to be displayed, and a predetermined projection plane 2 are defined in a three-dimensional display format. A predetermined virtual operation plane 3 is provided in addition to the projection plane 2. A pointing device designates a point which can move on an actual operation plane (not shown). The designation and selection of an object are executed via a three-dimensional cursor 4. The cursor 4 is made by drawing a half line from a point A on the virtual operation plane 3 toward the projection plane 2. The point A on the virtual operation plane 3 corresponds to the point on the actual operation plane which is designated by the pointing device.

Figure 4:
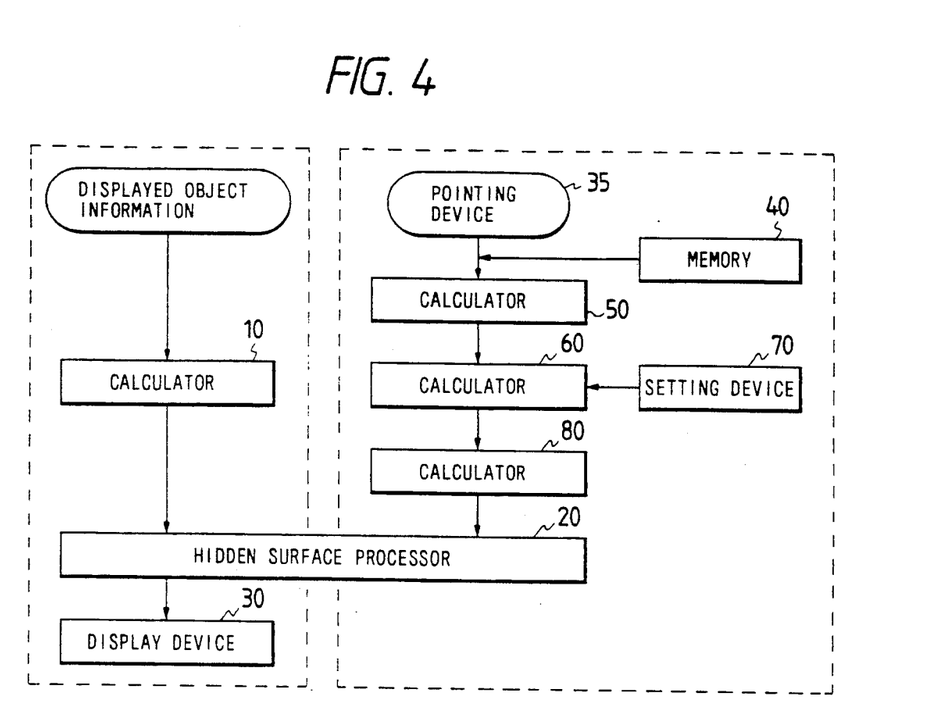
FIG. 4 is a block diagram of the three-dimensional display apparatus according to the first embodiment of this invention.

As shown in FIG. 4, a three-dimensional display apparatus includes a calculator 10 fed with information of an object 1 to be displayed. In the case where the object 1 is a circular cylinder, the object information represents the radius, the height, the coordinate of the center, and the direction of the axis. The calculator 10 calculates the coordinates of projection points C on the projection plane 2 which correspond to the principal vertexes of the object 1. The calculated projection coordinates are measured from the viewing point 5. The calculator 10 uses the object information and information of the position of the viewing point 5 and the projection plane 2 to calculate the projection coordinates.

The calculated projection coordinates are fed from the calculator 10 to a hidden surface processor 20. The hidden surface processor 20 uses the calculated projection coordinates, and evaluates a visible part and an invisible part of surfaces of the object 1 which are determined by the principal vertexes. The hidden surface processor 20 executes this evaluation through a suitable process such as a hidden surface process using a z buffer method. The hidden surface processor 20 outputs information of the visible part of the surfaces of the object 1 to a display device 30. The visible part of the surfaces of the object 1 is stereographically indicated on the screen of the display device 30.

A pointing device 35 outputs a signal representative of the position of a cursor 4 to a calculator 50. A memory 40 stores information of the position of the virtual operation plane 3 which relates to a direction of a normal with respect to the virtual operation plane 3 and a distance between the origin of a displayed three-dimensional space and the virtual operation plane 3. The calculator 50 is fed with the information of the position of the virtual operation plane 3 from the memory 40. The calculator 50 calculates the position of the starting point A, that is, the position of a pointer on the virtual operation plane 3, by use of the positional information fed from the devices 35 and 40.

An intersection angle between the virtual operation plane 3 and a half line starting from the point A is set via a setting device 70. This intersection angle is chosen to be different from zero. A joy stick or a keyboard can be used as the setting device 70. A calculator 60 is informed by the setting device 70 of the angle of the intersection which is set via the setting device 70. The calculator 60 is fed with the calculated position of the starting point A from the calculator 50. By using the information fed from the devices 50 and 70, the calculator 60 derives an indication of the position of a half line which intersects virtual operation plane 3 at the angle set via the setting device 70, and the calculator 60 calculates the coordinates of the point B at the intersection between the half line and the object 1.

As shown in FIG. 3, the three-dimensional cursor 4 is formed by the line connecting the starting point A and the point B of the intersection. A calculator 80 is fed with data of the calculated point B of the intersection from the calculator 60. The calculator 80 calculates a projection point D on the projection plane 2 which corresponds to the point B of the intersection. In addition, the calculator 80 is fed with data of the cursor line 4 from the calculator 60. The calculator 80 calculates the coordinates of a projection of the cursor line 4 on the projection plane 2. The calculators 10 and 80 may be in common.

The output data from the calculator 80 which represent the cursor line 4 are subjected by the hidden surface processor 20 to a hidden surface process In the case where the cursor half line 4 intersects with the object 1, the coordinates of intersection point B can be calculated by the calculator 60. When the invisible part of the cursor 4 is not to be displayed, the coordinates of intersection point B can also be calculated by the hidden surface processor 20 following the calculator 80. If the cursor half line does not intersect object 1, a half line starting from the point A is used as the cursor 4.

In the case where the cursor half line intersects the object 1, the segment between the points A and B may be used as the cursor 4.

Figure 5:
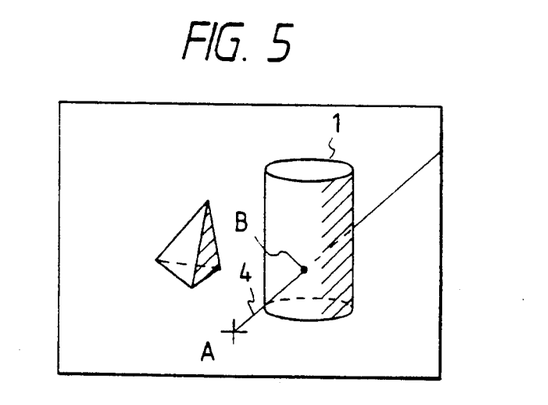
FIG. 5 is a diagram of an example of the state of an indication on the screen in the apparatus of FIG. 4.

The coordinates of the cursor line 4 are transmitted from the calculator 80 to the display device 30 via the hidden surface processor 20. As shown in FIG. 5, the cursor line 4 is stereographically indicated on the screen of the display device 30. The cursor line 4 can clearly designate an object and the positional relation between objects.

It should be noted that the calculators 10, 50, 60, and 80 may be in common.

DESCRIPTION OF THE SECOND PREFERRED EMBODIMENT

A second embodiment of this invention is similar to the embodiment of FIGS. 3-5 except for design changes indicated hereinafter.

Figure 6:
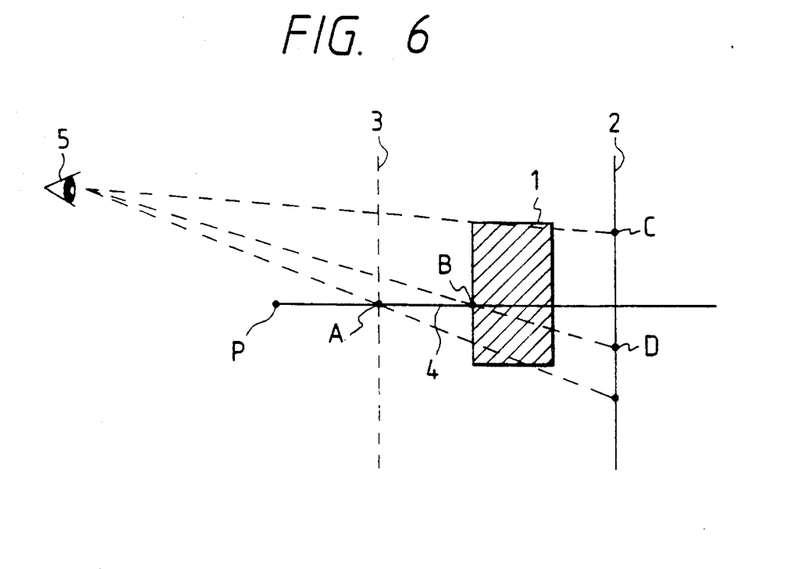
FIG. 6 is a diagram of a displayed object, a projection plane, a virtual operation plane, a cursor reference point, and a three-dimensional cursor line in a three-dimensional display apparatus according to a second embodiment of this invention.

As shown in FIG. 6, a cursor half line 4 is defined by use of a reference point P which extends outward of a virtual operation plane 3. Specifically, the cursor half line 4 starts at reference point P and passes through a point A on the virtual operation plane 3 which corresponds to a point designated by a pointing device.

Figure 7:
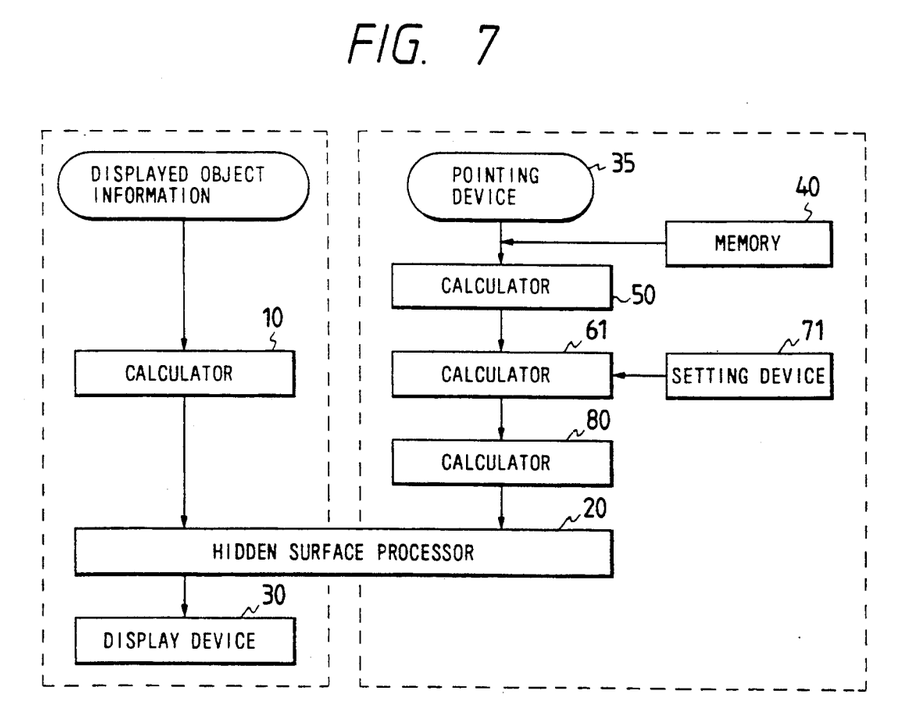
FIG. 7 is a block diagram of the three-dimensional display apparatus according to the second embodiment of this invention.

As shown in FIG. 7, a three-dimensional display apparatus includes a calculator 61 and a setting device 71 replacing the calculator 60 and the setting device 70 of FIG. 4. Coordinates of reference point P are set via the setting device 71. The information of the position of the reference point P is fed from the setting device 71 to the calculator 61. The calculator 61 calculates the half line starting from the reference point P and passing through the point A on the virtual operation plane 3. In addition, the calculator 61 calculates the position of the point B of the intersection between the half line 4 and an object 1.

In the case where the reference point P is close to the virtual operation plane 3, even a slight movement of a pointing device 35 causes a great variation in the angle of the direction of the cursor line 4 so that all of a far displayed three-dimensional space can be easily designated.

DESCRIPTION OF THE THIRD PREFERRED EMBODIMENT

Figure 8:
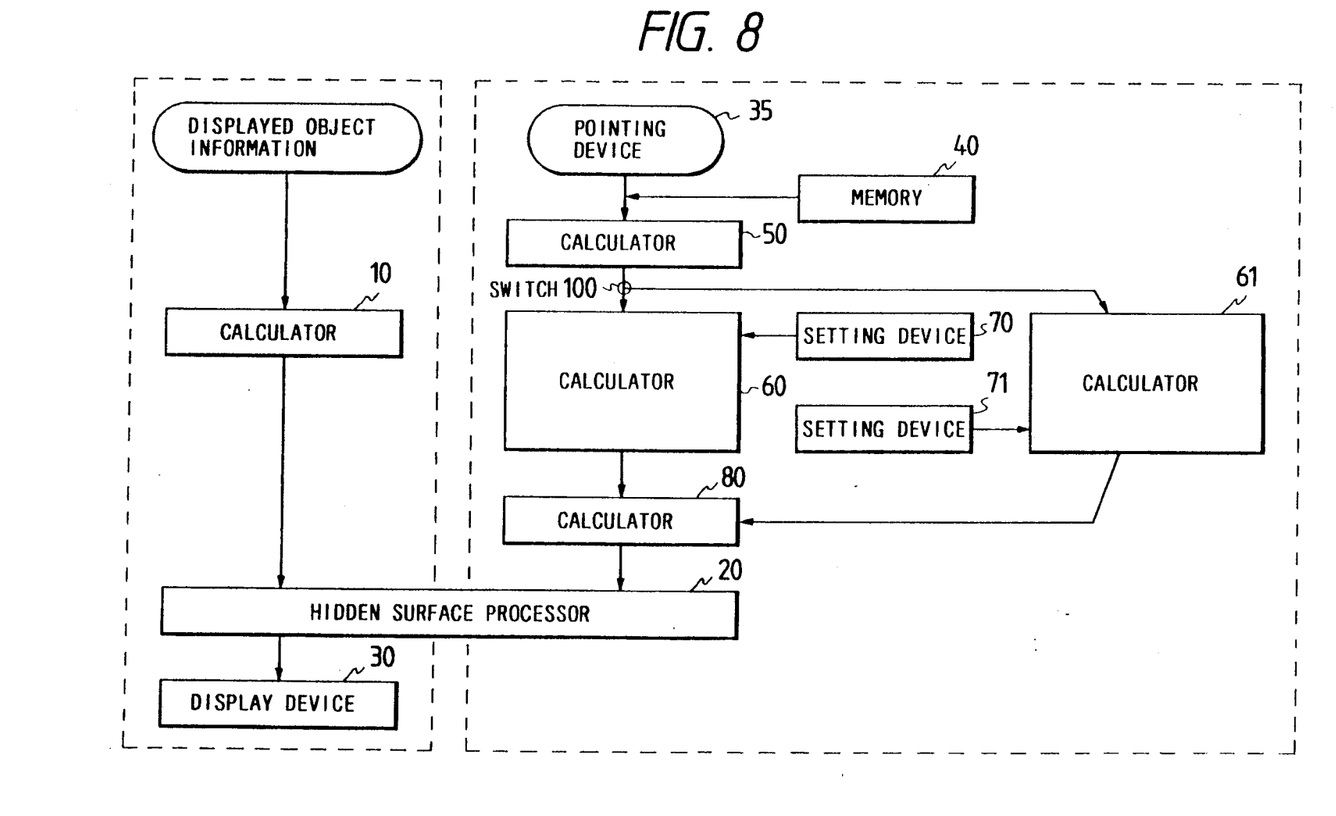
FIG. 8 is a block diagram of a three-dimensional display apparatus according to a third embodiment of this invention.

FIG. 8 is a block diagram of a third embodiment of this invention which is similar to the embodiment of FIGS. 3-5 except for design changes indicated hereinafter.

In the embodiment of FIG. 8, a switch 100 is interposed between calculators 50 and 60. A calculator 61 is connected between the switch 100 and a calculator 80. A setting device 71 is connected to the calculator 61. The calculator 61 and the setting device 71 are similar to those of FIG. 7. The switch 100 selectively connects the calculator 50 to one of the calculators 60 and 61.

When the switch 100 connects the calculator 50 to the calculator 60, the calculator 60 and a related setting device 70 are activated. In this case, the embodiment of FIG. 8 operates similarly to the operation of the embodiment of FIGS. 3-5.

When the switch 100 connects the calculator 50 to the calculator 61, the calculator 61 and the related setting device 71 are activated. In this case, the embodiment of FIG. 8 operates similarly to the operation of the embodiment of FIGS. 6 and 7.

DESCRIPTION OF THE FOURTH PREFERRED EMBODIMENT

Figure 9:
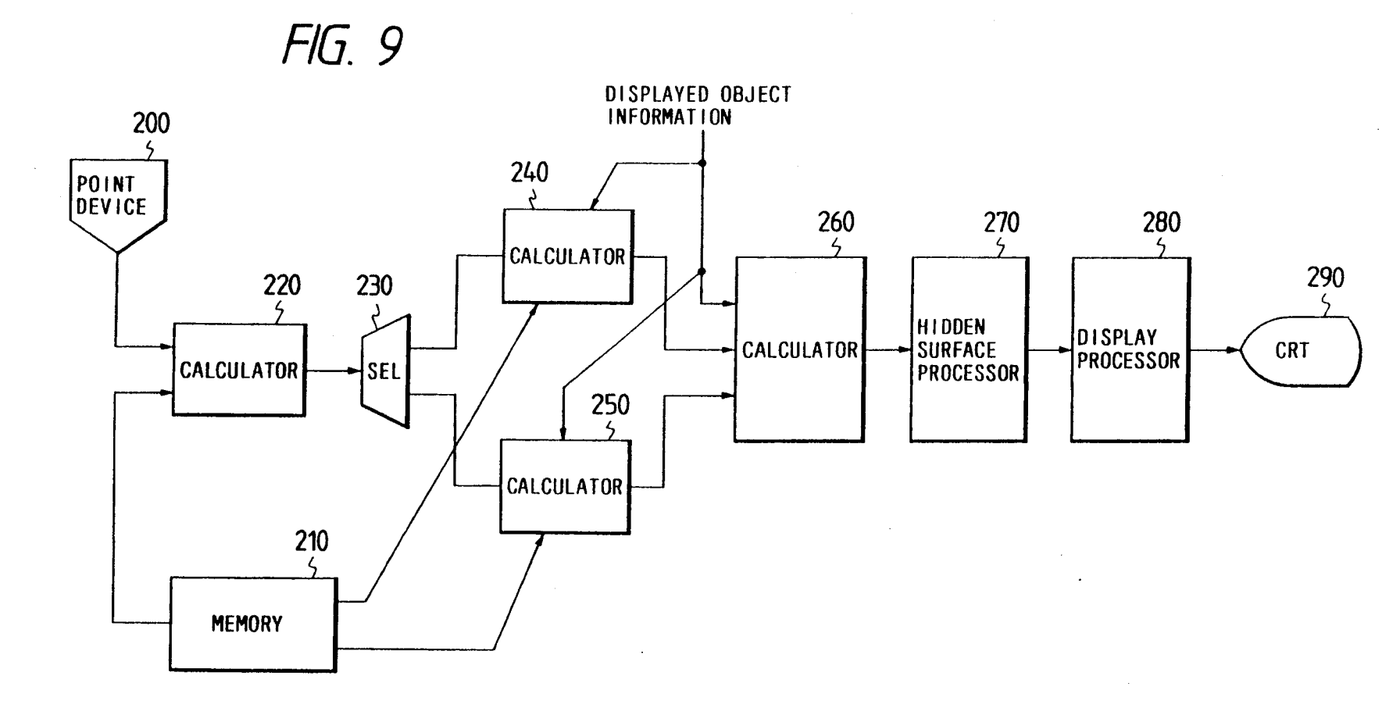
FIG. 9 is a block diagram of a three-dimensional display apparatus according to a fourth embodiment of this invention.

FIG. 9 shows a fourth embodiment of this invention which is basically similar to the embodiment of FIG. 8.

In the embodiment of FIG. 9, a memory 210 stores information of the position of a virtual operation plane, information of the angle of a cursor intersection, and information of a fixed reference point for a cursor. A calculator 220 is fed with the information of the position of the virtual operation plane from the memory 210. In addition, the calculator 220 is fed with positional information from a pointing device 200. The calculator 220 calculates the apparent position of a pointer on the virtual operation plane by use of the information of the position of the virtual operation plane and the pointing device positional information. A selector 230 selectively transmits output data from the calculator 220 to one of calculators 240 and 250.

The calculator 240 is fed with information of an object to be displayed from a suitable device (not shown in FIG. 9). In addition, the calculator 240 is fed with the information of the angle of the cursor intersection from the memory 210. In the case where the selector 230 transmits the output data from the calculator 220 to the calculator 240, the calculator 240 derives information of a cursor line and information of the point of the intersection between the cursor line and an object from the information of the position of the pointer on the virtual operation plane, the information of the object, and the information of the angle of the cursor intersection.

The calculator 250 is fed with the information of the object. In addition, the calculator 250 is fed with the information of the reference point for the cursor from the memory 210. In the case where the selector 230 transmits the output data from the calculator 220 to the calculator 250. the calculator 250 derives information of a cursor line and information of the point of the intersection between the cursor line and the object.

A calculator 260 is fed with output data from the calculators 240 and 250. In addition. the calculator 260 is fed with the information of the object. The calculator 260 calculates the projection coordinates of the object and the cursor line. A hidden surface processor 270 subjects the output data from the calculator 260 to a hidden surface process. The hidden surface processor 270 outputs data representing the visible parts of the object and the cursor line. The output data from the hidden surface processor 270 are converted by a display signal processor 280 into a corresponding video signal. The output video signal from the display signal processor 280 is visualized by a CRT 290 so that the visible parts of the object and the cursor line are indicated on the screen of the CRT 290.

The following structure and function may be added. In order that a displayed object with which the three-dimensional cursor line 4 intersects at first can be selected (see FIG. 5). an information input device and a recognition device are additionally provided. For example. the information input device includes a button on a pointing device. When a given signal is inputted via the information input device. the recognition device recognizes the object forming the point B of the intersection. The recognition device may include means for setting a flag in the stored information of the object when the information input device is operated. the flag representing that the object is selected. This type of the recognition device is similar to a conventional device. The characteristics. such as the color or the shape. of the displayed object may be changed.

DESCRIPTION OF THE FIFTH PREFERRED EMBODIMENT

Figure 10:
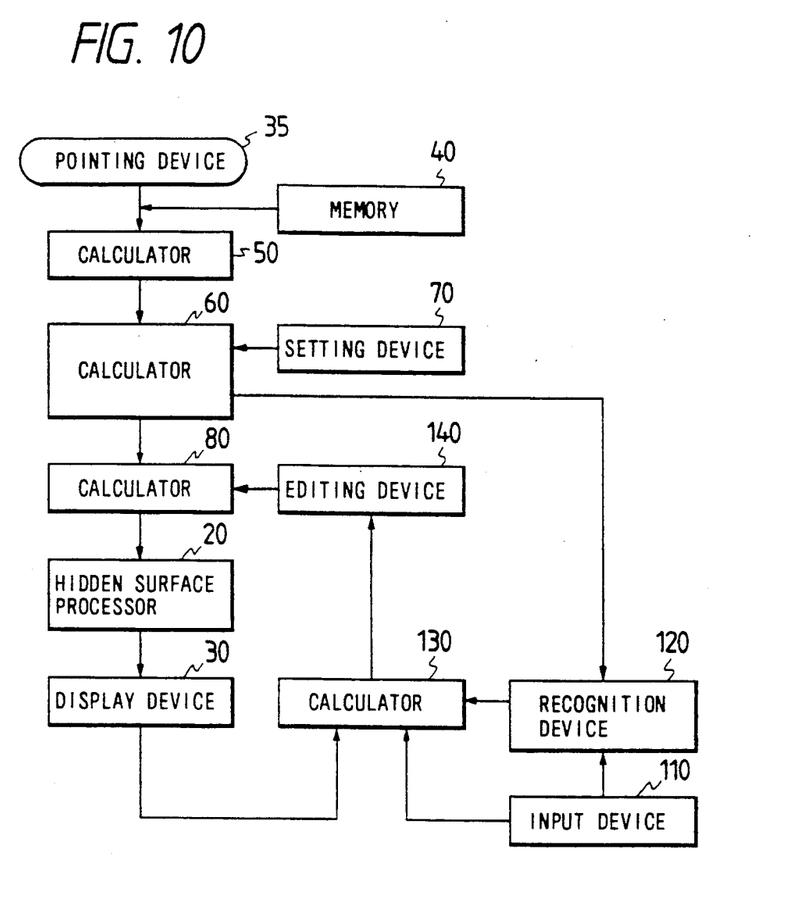
FIG. 10 is a block diagram of a three-dimensional display apparatus according to a fifth embodiment of this invention.

FIG. 10 is a block diagram of a fifth embodiment of this invention which is similar to the embodiment of FIGS. 3-5 except for an additional design indicated later. The embodiment of FIG. 10 is designed so that a selected displayed object can be translated along a cursor line.

In the embodiment of FIG. 10. an information input device 110 is provided on a pointing device 35. When a given signal is inputted via the information input device 110. a recognition device 120 recognizes a displayed object intersecting with a cursor line. A calculator 130 changes the center coordinates of the recognized object in response to another given signal inputted via the information input device 110. and calculates the coordinates of the principal vertexes of the displayed object which occur after the change. An editing device 140 writes the output data from the calculator 130 for the stored information of the displayed object into calculator 80.

DESCRIPTION OF THE SIXTH PREFERRED EMBODIMENT

Figure 11:
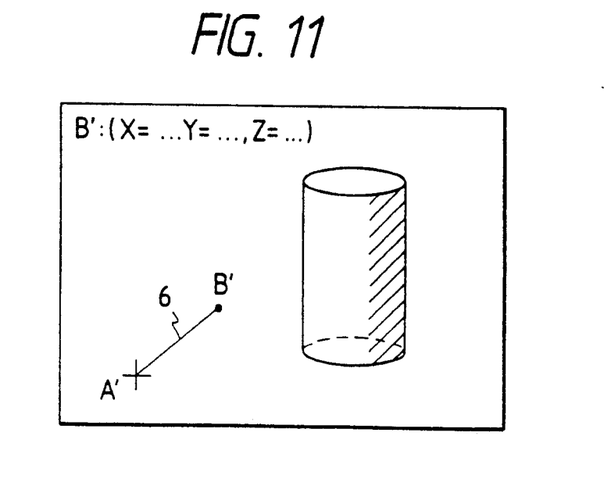
FIG. 11 is a diagram of an example of the state of an indication on the screen in a three-dimensional display apparatus according to a sixth embodiment of this invention.

A sixth embodiment of this invention is similar to the embodiment of FIGS. 3-5 except for the following design change. In the sixth embodiment. as shown in FIG. 11. the coordinate position B' of a cursor segment 6 of an arbitrary length from a starting point A' can be registered. In this case. a new figure can be formed by using the point B' as a reference. The sixth embodiment has an additional calculator which calculates the coordinate of a point separated from the starting point A' by a given distance.

DESCRIPTION OF THE SEVENTH PREFERRED EMBODIMENT

A seventh embodiment of this invention is similar to the embodiment of FIGS. 3-5 except for the following design change. The seventh embodiment is designed so that a three-dimensional cursor can represent the position of a designated coordinate value inputted via an input device (for example. a keyboard) separate from a pointing device.

In the seventh embodiment. a half line is drawn from the designated coordinate position at an angle set via an angle setting device 70. A calculator 60 calculates the coordinate of the point of the intersection between the half line and a virtual operation plane 3. A calculator 80 calculates the projection coordinates of the segment connecting the point of the intersection and the designated coordinate. The calculated projection coordinates of the segment are indicated by a display device 30. Thereby. it is easy to know the position of the designated coordinate relative to a displayed object in a depth direction.

What is claimed is:

1. A three-dimensional display apparatus comprising:
    means for calculating projection coordinates of principal vertexes of a displayed object with respect to a projection plane from a viewing point;
    means for evaluating whether surfaces of the object which are determined by the principal vertexes are visible or invisible from the viewing point;
    means for indicating a result of the evaluating by said evaluating means;
    a memory storing information of a position of a predetermined virtual operation plane;
    a pointing device movable on an actual operation plane;
    means connected to the memory and the pointing device for calculating a correspondence point on the virtual operation plane which corresponds to a position of the pointing device when the pointing device moves on the actual operation plane;
    first line calculating means for calculating the position of a half line which starts from the correspondence point and which intersects the virtual operation plane at a predetermined angle;
    means for setting said predetermined angle;
    second line calculating means for calculating the position of a half line which starts from a reference point and which passes through the correspondence point, the reference point being displaced from the virtual operation plane;
    means for setting said reference point;
    means for selecting one of the first line calculating means and the second line calculating means;
    means for calculating the position of an intersection point between the displayed object and the half line calculated by said selected one of the first line calculating means and the second line calculating means;
    means for calculating projection coordinates of at least part of the half line calculated by said selected one of the first line calculating means and the second line calculating means with respect to the projection plane; and means for indicating the calculated projection coordinates of at least part of the half line and the calculated point of the intersection.

2. Apparatus for displaying perspective images comprising:

a pointing device movable on an actual operating plane for deriving a signal indicative of movement of the device to designated points on the operating plane;

an electronic display having a two dimensional monoscopic display surface for displaying a perspective image of an object;

computer means responsive to the derived signal for supplying perspective image representing signals to the electronic display for display on the two dimensional monoscopic display surface;

the computer means including a memory, selector and performing the following operations:

calculating projection coordinates of principal vertexes of a displayed object on the display with respect to a projection plane on the display from a viewing point of the display, evaluating whether surfaces of the displayed object which are determined by the principal vertexes are visible or invisible from the viewing point, indicating the result of the evaluation, the memory storing information of a position of a predetermined virtual operation plane relative to the monoscopic display surface, responding to the stored information of the virtual operation plane position to calculate a correspondence point on the virtual operation plane corresponding to a position of the pointing device as the pointing device moves on the actual operating plane, calculating the position of a first three dimensional cursor formed by a first half line which starts from the correspondence point and intersects with the virtual operation plane at a predetermined settable angle, calculating a second half line which starts from a settable reference point and which passes through the correspondence point, the reference point being spaced from the virtual operation plane, the selector selecting either the first or second calculated half lines, calculating an intersection point between the displayed object and the selected calculated half line, calculating projection coordinates of at least part of the selected calculated half line with respect to the projection plane, and supplying the display with a signal causing the display to indicate the calculated projection coordinates of at least part of the selected calculated half line and the calculated intersection point.

* * * * *